J. A. SHEARER.
SPRING SUSPENSION DEVICE FOR VEHICLES.
APPLICATION FILED JULY 3, 1914.
1,129,744.
Patented Feb. 23, 1915.
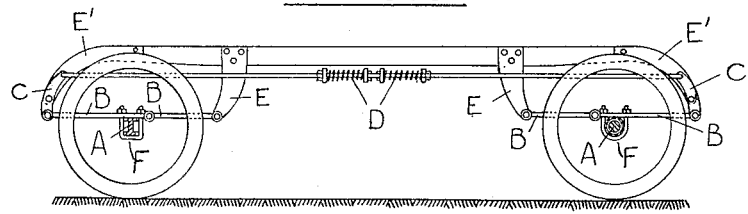
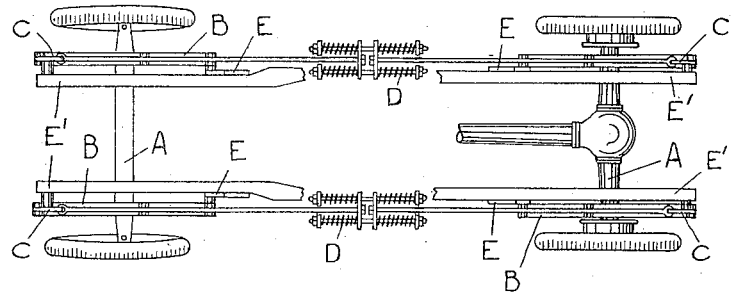
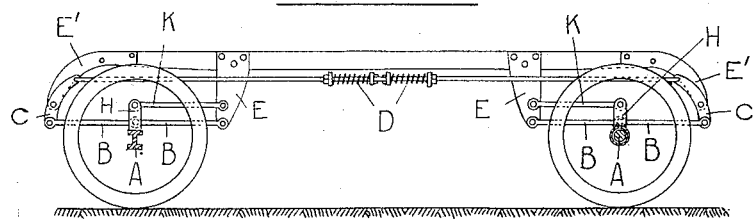
WITNESSES:
Chas. H. Leibman.
J. D. Rollhaus
INVENTOR
John Alexander Shearer.
BY
Munn & Co.
ATTORNEYS.

UNITED STATES PATENT OFFICE.

JOHN ALEXANDER SHEARER, OF PARKSIDE, SOUTH AUSTRALIA, AUSTRALIA.

SPRING SUSPENSION DEVICE FOR VEHICLES.

1,129,744.           Specification of Letters Patent.      Patented Feb. 23, 1915.

Original application filed March 12, 1913, Serial No. 753,725. Divided and this application filed July 3, 1914. Serial No. 848,769.

*To all whom it may concern:*

Be it known that I, JOHN ALEXANDER SHEARER, blacksmith, a subject of the King of Great Britain and Ireland, residing at Glen Osmond Road, Parkside, State of South Australia, Commonwealth of Australia, have invented a certain new and useful Improved Spring Suspension Device for Vehicles, of which the following is a specification.

The application is a divisional application of that of my application Serial Number 753,725 filed 12th March 1913.

This invention relates to the suspension or mounting of the frame of a motor car or other vehicle or traveling machine upon its axles by means of levers connected with each axle and pivoted to the frame and adapted to be moved against the action of a spring or springs when said axle rises relatively to the frame or chassis so as to absorb the shock or jar caused by the passage over rough roads or over irregularities or obstacles; and the object of this invention is to provide an improved construction of this nature which will more efficiently prevent the transmission of shock or jar to the frame of the car, vehicle or machine.

According to my present invention each end of the axle is attached to the pivotally connected adjacent inner ends of two longitudinal and approximately horizontal links, the outer end or ends of one or both of which is or are pivotally connected to the frame of the car, vehicle or machine by a lever and spring device which tends to keep the links as nearly as possible in a straight line and to restore them thereto after displacement. There are two links, one in front and one behind, with a lever and spring device at each end of each axle. As the wheel passes over an obstruction the axle rises relatively to the frame and carries with it the adjacent inner ends of the links, the outer ends of the links being drawn together horizontally in opposition to the pull of the spring device and without any direct lift of the frame.

In order that my invention may be the more clearly understood I will describe the same with reference to the accompanying drawings in which:—

Figures 1 and 2 are respectively side and plan views showing the front and rear axles having a suspension device common to both. Fig. 3 is a similar view to Fig. 1 but showing supplementary links to prevent any rocking of the axles.

As shown in the drawings each axle A is attached to the pivotally connected adjacent inner ends of two approximately horizontal links B B. The rear link B of the front axle and the front link B of the rear axle are pivotally attached direct to brackets E' E' secured to and projecting downwardly from the frame, and the outer ends of the front link of the front axle and of the rear link of the rear axle respectively are pivotally attached to the lower ends of two approximately vertical levers C C pivoted at about their centers to brackets E' E', the upper ends of the two levers being connected together by rods and a spring D or set of springs tending to draw them together. In Fig. 1 the axles are shown attached by U bolts F to the underside of the links B close up to their pivotally connected adjacent ends. In Fig. 3 are shown supplementary links K pivotally attached to brackets E at the one end and to the axle clips H at the other to prevent the axles from rocking backward or forward.

The brackets E E' may be integral with the side bars of the car, vehicle or machine or they may be riveted or otherwise suitably secured thereto. The effect of this method of suspension is that the wheels and the axle, in passing over an obstruction or any unevenness in the road, are able to move up and down without transmitting any concussion or jar to the frame. The axle A and the adjacent inner ends of the links B B move upward, the outer ends of the links move horizontally inward rocking the levers C C on their pivots and distorting the spring D practically without lifting the levers vertically and consequently without lifting the frame. The spring in recovering from its distortion restores the levers to their vertical position and the links to their horizontal position.

Having now fully described and ascertained my said invention and the manner in which it is to be performed I declare that what I claim is:—

1. An improved suspension device for vehicles having two axles comprising, near each end of each axle, two longitudinal and approximately horizontal links, the adjacent inner ends of which are pivotally connected together and to the axle, and the outer ends of the rear link of the front axle and of the front link of the rear axle being pivotally attached to brackets secured to and projecting downward from the frame of the vehicle, the outer ends of the front link of the front axle and of the rear link of the rear axle being pivotally attached to the lower ends of two approximately vertical levers pivoted at about their centers to other brackets secured to and depending downward from the frame, and the upper ends of the two levers being connected together by a spring or springs tending to maintain the four links in a horizontal position.

2. An improved suspension device for vehicles having two axles comprising, near each end of each axle, two longitudinal and approximately horizontal links, the adjacent inner ends of which are pivotally connected together and to the axle, and the outer ends of the rear link of the front axle and of the front link of the rear axle being pivotally attached to brackets secured to and projecting downward from the frame of the vehicle, the outer ends of the front link of the front axle and of the rear link of the rear axle being pivotally attached to the lower ends of two approximately vertical levers pivoted at about their centers to other brackets secured to and depending downward from the frame, and the upper ends of the two levers being connected together by a spring or springs tending to maintain the four links in a horizontal position, and two additional links arranged parallel with and over the rear link of the front axle and the front link of the rear axle respectively connecting the front and rear axles with the brackets to which the said rear and front links are connected.

3. In a vehicle, a frame, front and rear axles, a pair of links adjacent to each axle, the links of a pair being oppositely connected at adjacent ends with each other and with the adjacent axle, and extending respectively forwardly and rearwardly from the axle, the outer end of the rear link of the front axle and the outer end of the front link of the rear axle being pivotally secured to members of said frame, a lever fulcrumed between its ends on the frame adjacent to each axle, the outer end of the front link of the front axle being pivotally connected to one end of one of said levers, and the outer end of the rear link of the rear axle being pivotally connected with one end of the other of said levers, and a resilient connection between the opposite ends of said levers.

In testimony that I claim the foregoing as my invention I have signed my name in the presence of two subscribing witnesses this twenty-sixth day of May 1914.

JOHN ALEXANDER SHEARER.

Witnesses:
ARTHUR GORE COLLISON,
LIONEL CLIFTON PASH.

Copies of this patent may be obtained for five cents each, by addressing the "Commissioner of Patents, Washington, D. C."